United States Patent
Mellot et al.

(10) Patent No.: US 10,837,825 B2
(45) Date of Patent: Nov. 17, 2020

(54) METHOD OF AMBIENT LUMINOSITY LEVEL DETECTION, AND CORRESPONDING SENSOR

(71) Applicants: STMicroelectronics (Grenoble 2) SAS, Grenoble (FR); STMicroelectronics (Alps) SAS, Grenoble (FR)

(72) Inventors: Pascal Mellot, Lans en Vercors (FR); Jean-Jacques Rouger, Grenoble (FR)

(73) Assignees: STMICROELECTRONICS (ALPS) SAS, Grenoble (FR); STMICROELECTRONICS (GRENOBLE 2) SAS, Grenoble (FR)

( * ) Notice: Subject to any disclaimer, the term of this patent is extended or adjusted under 35 U.S.C. 154(b) by 62 days.

(21) Appl. No.: 16/151,118

(22) Filed: Oct. 3, 2018

(65) Prior Publication Data
US 2019/0101442 A1  Apr. 4, 2019

(30) Foreign Application Priority Data
Oct. 4, 2017  (FR) ...................................... 17 59262

(51) Int. Cl.
| | | |
|---|---|---|
| *G01J 1/42* | (2006.01) | |
| *G01J 1/44* | (2006.01) | |
| *G06F 1/06* | (2006.01) | |
| *G01J 1/18* | (2006.01) | |
| *G01J 1/02* | (2006.01) | |

(52) U.S. Cl.
CPC ............ *G01J 1/4204* (2013.01); *G01J 1/0228* (2013.01); *G01J 1/18* (2013.01); *G01J 1/44* (2013.01); *G06F 1/06* (2013.01); *G01J 2001/446* (2013.01)

(58) Field of Classification Search
CPC .......... G01J 1/4204; G01J 1/0228; G01J 1/18; G01J 1/44; G01J 2001/446; G06F 1/06
USPC ..................................................... 250/214 AL
See application file for complete search history.

(56) References Cited

U.S. PATENT DOCUMENTS

| | | | | |
|---|---|---|---|---|
| 7,030,378 | B2 * | 4/2006 | Allen ..................... | H01L 27/146 250/332 |
| 7,109,465 | B2 * | 9/2006 | Kok ....................... | G09G 3/3413 250/214 AL |
| 7,462,811 | B2 * | 12/2008 | Cok ......................... | G01J 1/46 250/214 AL |
| 8,592,744 | B2 | 11/2013 | Van Dalen et al. | |
| 8,878,830 | B2 * | 11/2014 | Raynor ................... | G01J 1/46 250/214 AL |
| 9,074,939 | B2 | 7/2015 | Mellot | |
| 9,160,319 | B2 * | 10/2015 | Kato ................... | H03M 1/0607 |

(Continued)

FOREIGN PATENT DOCUMENTS

| | | |
|---|---|---|
| EP | 0645612 A1 | 3/1995 |
| EP | 2234179 A1 | 9/2010 |
| FR | 2997496 A1 | 5/2014 |

*Primary Examiner* — Seung C Sohn
(74) *Attorney, Agent, or Firm* — Slater Matsil, LLP (57) ABSTRACT

A method of detecting ambient luminous radiation includes resetting and triggering a counter each time a photodiode illuminated by the ambient luminous radiation reaches a discharge threshold. The counter is then being clocked by a clock signal having a first frequency and delivering a counter output signal. The method further includes generating an AC signal representative of the ambient luminous radiation by converting, from digital to analog, a digital signal obtained from the counter output signal.

27 Claims, 4 Drawing Sheets

FIG.2

(56) References Cited

U.S. PATENT DOCUMENTS

2009/0109427 A1     4/2009   Yee et al.
2016/0018257 A1     1/2016   Mirov et al.

\* cited by examiner

METHOD OF AMBIENT LUMINOSITY LEVEL DETECTION, AND CORRESPONDING SENSOR

CROSS-REFERENCE TO RELATED APPLICATIONS

This application claims priority to French Patent Application No. 1759262, filed on Oct. 4, 2017, which application is hereby incorporated herein by reference.

TECHNICAL FIELD

Implementations and embodiments of the invention relate to detectors of light level and in particular to detectors of ambient light level (or ambient light sensors (ALS)) liable to be incorporated into devices such as mobile phones, tablets or laptops.

BACKGROUND

Generally, a conventional detector of ambient light level comprises at least one photodiode. The decrease in the voltage across the terminals of each photodiode depends on the amount of light received by this photodiode.

It is generally possible to deduce an ambient light level by measuring the voltage across the terminals of each photodiode at the end of an integration period before and after which the detector is reset by recharging the corresponding photodiode.

Nevertheless, such a detection of light level is generally sensitive to the flicker of artificial light sources powered with AC current and that illuminate the photodiode.

Such flicker may in particular negatively affect the results of the detection of ambient light level, for example with the appearance of moiré patterns in images taken with an image-capturing device coupled to the detector.

In a case where the artificial light sources are powered with mains voltage at 50 Hz/60 Hz, one way of solving this problem of flicker consists in choosing a photodiode integration period that is a multiple of the half-period of the mains voltage, i.e. a multiple of 10 ms for an AC voltage at 50 Hz or a multiple of 8.33 ms for an AC voltage at 60 Hz. Such a solution is described in French Patent Publication FR 2 997 496 filed on Oct. 25, 2012 (US counterpart U.S. Pat. No. 9,074,939B2 filed on Oct. 10, 2013), which are both incorporated herein by reference.

However, over the last few years, the widespread use of artificial light sources in particular based on light-emitting-diode (LED) technology and on energy saving lights has created flicker sources that are based on AC frequencies other than the conventional frequencies, namely 50 Hz or 60 Hz.

In addition, a conventional detector of ambient light level is generally designed to generate only DC output signals, which unfortunately contain no information on the random frequency or frequencies of the sources of flicker.

SUMMARY

According to one aspect, a method of detecting characteristics of ambient luminous radiation is provided. This method includes resetting and triggering a counter each time a photodiode illuminated by the ambient luminous radiation reaches a discharge threshold. The counter is then being clocked by a clock signal having a first frequency and delivering a counter output signal. The method further includes converting, from digital to analog, a digital signal obtained from the counter output signal so as to generate an AC signal representative of the level and of one or more frequencies of the ambient luminous radiation.

Such a method advantageously allows post-processing to then be carried out on said AC signal, for example by a microcontroller, so as to determine the light level and the one or more frequencies of the ambient luminous radiation.

Advantageously, an image-capturing device may for example use this information to prevent any problems related to the flicker of the ambient luminous radiation.

Although said digital signal may be the counter output signal, it is preferable to carry out one or more intermediate processing operations to generate the digital signal from the counter output signal, so as to obtain a better balance between the performance and power consumption of such a detecting method.

Thus, according to one implementation, the method comprises generation of an intermediate signal including clipping and inverting the counter output signal. Said digital signal is then obtained from the intermediate signal.

Such clipping advantageously allows periods in which the light level is too low to be removed and the amplitude of the generated intermediate signal is advantageously proportional to the detected light level after inversion.

According to another implementation, the method comprises undersampling the intermediate signal at a second frequency lower than the first frequency.

It should be noted that the frequency at which the counter is triggered is variable and depends on the ambient luminous radiation received by said at least one photodiode.

Thus, it is desirable to carry out such undersampling at the known and if possible constant second frequency so as to allow optional digital filtering on the intermediate signal.

Advantageously, such undersampling also allows the computational power required for subsequent processing operations to be decreased while preserving design flexibility and a satisfactory precision.

According to yet another implementation, the method furthermore comprises passband filtering the sampled intermediate signal, said digital signal then being the filtered signal.

Advantageously, such passband filtering allows flicker frequencies that are uncommon in everyday life to be filtered out so as to further improve the performance of the detecting method.

By way of example, the passband filtering may possess a low cut-off frequency of about 66 Hz and a high cut-off frequency of about 2 kHz.

The first frequency may for example be higher than the reset frequency of the counter.

The photodiode may for example be reset when it reaches said discharge threshold.

By way of nonlimiting example, the discharge threshold of the photodiode may be chosen so as to obtain a counter reset frequency of higher than 4 kHz.

According to another aspect, an electronic circuit is provided. This circuit includes a photodiode; a counter that is configured to be clocked by a clock signal having a first frequency so as to deliver a counter output signal; a control module that is configured to reset and trigger the counter when said at least one photodiode illuminated by ambient luminous radiation reaches a discharge threshold; and a processing stage including a converting module configured to perform a digital-to-analog conversion of a digital signal obtained from the counter output signal so as to generate an AC signal representative of the level and of the frequency or frequencies of the ambient luminous radiation.

Advantageously, this electronic circuit is compatible with the circuit disclosed in document FR 2 997 496, which is configured to generate a DC output signal.

In other words, it is possible to simultaneously generate DC and AC output signals without using two completely separate circuits, this advantageously saving silicon real estate and decreasing the overall power consumption of said electronic circuit.

According to one embodiment, the processing stage furthermore comprises a processing module configured to generate an intermediate signal by clipping and inverting the counter output signal, said digital signal being obtained from said intermediate signal.

According to another embodiment, the processing stage furthermore comprises a sampling module that is configured to undersample the intermediate signal at a second frequency that is less high than the first frequency.

According to yet another embodiment, the processing stage furthermore comprises a filtering module configured to passband filter the sampled intermediate signal. The digital signal is the filtered signal.

By way of nonlimiting indication, the passband filtering may possess a low cut-off frequency of about 66 Hz and a high cut-off frequency of about 2 kHz.

The first frequency may for example be higher than the frequency of the reset of the counter.

By way of example, the control module may furthermore be configured to reset the photodiode when the latter reaches said discharge threshold.

The circuit may for example be produced in digital technology.

According to another aspect, a detector of ambient light level comprising at least one circuit such as defined above is provided.

According to another aspect, an electronic device, such as a laptop, tablet and cellular mobile telephone, comprising at least one detector such as defined above is provided.

According to yet another aspect, a motor vehicle comprising at least one detector such as defined above is provided.

BRIEF DESCRIPTION OF THE DRAWINGS

Other advantages and features of the invention will become apparent on examining the detailed description of completely nonlimiting implementations and embodiments and the appended drawings, in which.

DETAILED DESCRIPTION OF ILLUSTRATIVE EMBODIMENTS

Embodiments of the present invention describe a small silicon footprint circuit of a low complexity that generates AC output signals corresponding to the variation in the ambient light level in proximity to each photodiode of a detector of ambient light level. These AC output signals are intended to be delivered to a host processor, for example a microcontroller, able to calculate the flicker frequencies of the light sources on the basis of these AC output signals. Therefore, this information on flicker frequencies allows the processor to choose a suitable exposure time so as to prevent such a problem with variable-frequency flicker.

Figure 1:
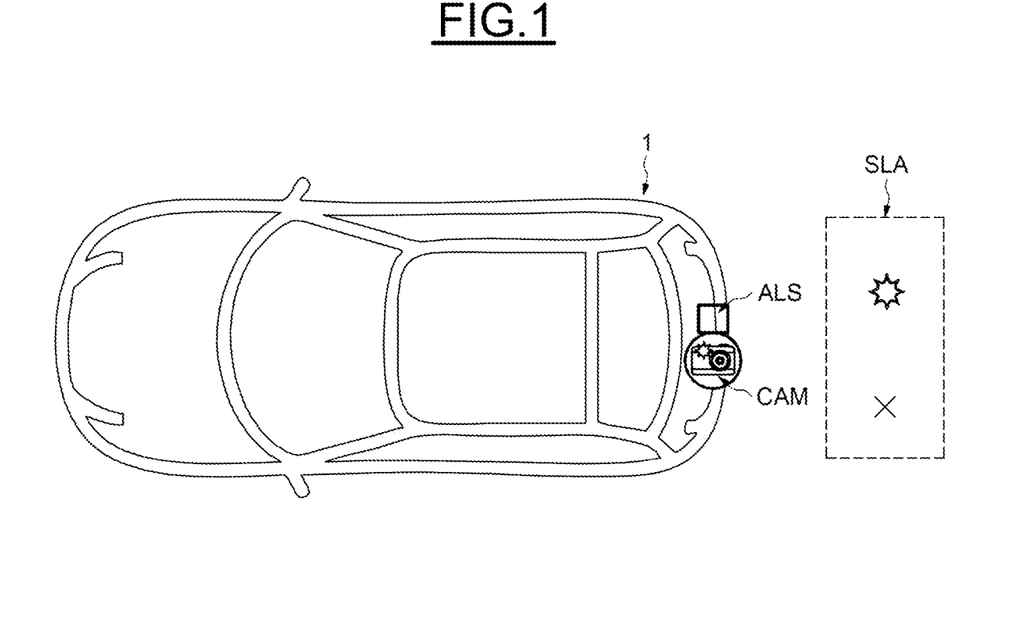
FIGS. 1 to 6 schematically illustrate implementations and embodiments of the invention.

The reference 1 in FIG. 1 illustrates a motor vehicle, for example a car 1, equipped with at least one detector of ambient light level, here for example a detector ALS placed at the back of the car and in proximity to a reversing camera system CAM of the car 1.

The detector ALS of ambient light level is configured to measure the light level in proximity to the detector ALS and to deliver to the reversing camera system CAM one or more signals representative of the one or more flicker frequencies of artificial light sources SLA in proximity to the car 1.

It should be noted that artificial light sources SLA based on light-emitting-diode (LED) technology, for example car LED rear lights and headlights, have been widely used in everyday life for a number of years.

Therefore, the one or more flicker frequencies of the artificial light sources SLA are no longer limited to conventional frequencies, i.e. 50 Hz and 60 Hz. By way of indication, the flicker frequencies may vary between a few Hz and 2 kHz.

Figure 2:
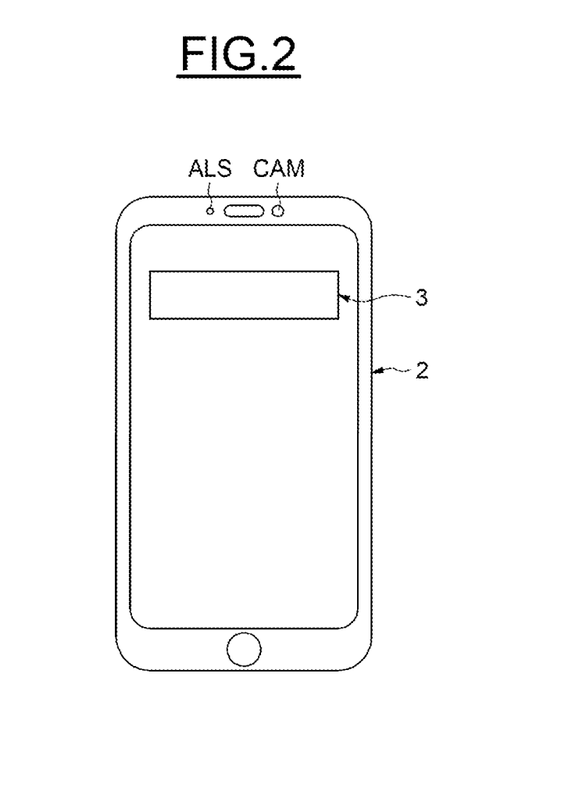

FIG. 2 very schematically illustrates an electronic device 2, here, for example, a smart phone 2 including a detector ALS of ambient light level placed in proximity to a camera module CAM, here for example a front-facing camera module CAM, and a processing unit 3, here for example an image processor 3.

The detector ALS of ambient light level is configured to deliver, to the image processor 3, at least one AC output signal so as to allow said processor 3 to determine the one or more flicker frequencies in proximity to the detector ALS, and the ambient light level.

Thus, the processor 3 may be configured to choose a suitable exposure time by taking into account the detected flicker frequencies so as to make the camera module CAM insensitive to said one or more flickers and to therefore increase the quality of images taken with the camera module CAM.

Figure 3:
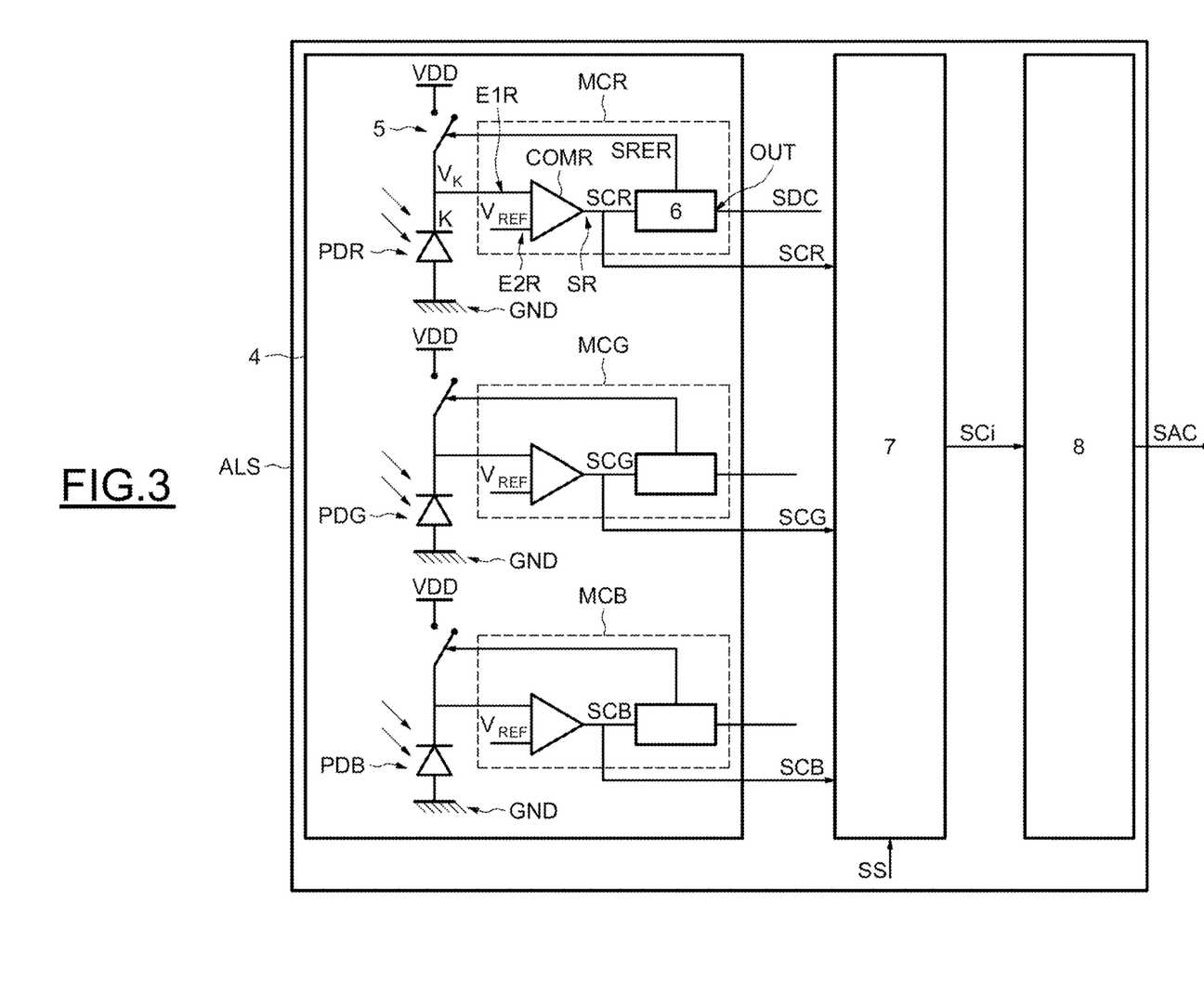

Reference is now made to FIG. 3 in order to schematically illustrate one embodiment of the detector ALS of ambient light level.

The detector ALS comprises a first circuit 4 including at least one photodiode, here for example three photodiodes PDR, PDG, and PDB, each intended to receive light of a separate colour (red R, green G, blue B) and each connected to a corresponding control module MCR, MCG, and MCB.

By way of example, the first circuit 4 may also include other photodiodes intended to for example receive infrared radiation having a wavelength longer than 850 nm.

As the structures of each photodiode PDR, PDG or PDB and its corresponding control module MCR, MCG or MCB are identical, for the sake of simplicity the simplified circuit diagram of the photodiode PDR and its corresponding control module MCR will be focused on.

The anode of the photodiode PDR is coupled to ground GND and the cathode K of the photodiode PDR is coupled to a positive supply terminal VDD of the first circuit 4 via a reset switch 5, here for example embodied by a MOS transistor.

The control module MCR comprises: a comparator COMR including a first input E1R coupled to the cathode K of the photodiode PDR, a second input E2R coupled to a reference voltage VREF and an output SR; and a control stage 6 coupled to the output SR and to the switch 5.

The comparator COMR is known per se to those skilled in the art and configured to deliver a comparison signal SCR to the output SR depending on the voltages present on the first input E1R and the second input E2R.

Figure 4:
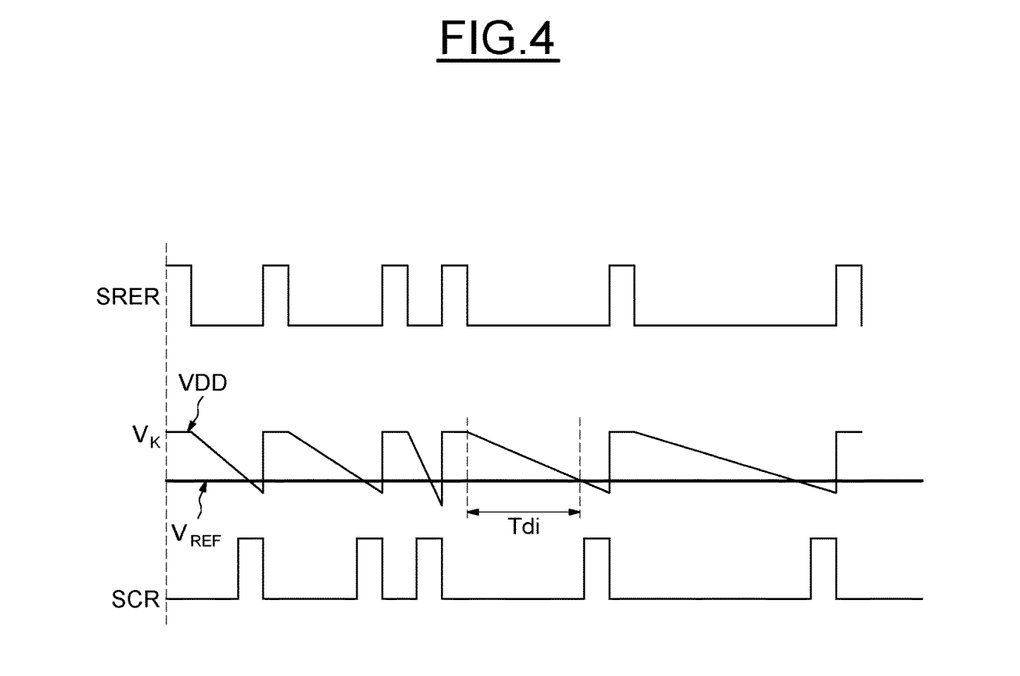

FIG. 4 shows a timing diagram illustrating the operation of the photodiode PDR and of the corresponding control module MCR.

When the voltage present on the first input E1R, in other words the voltage VK of the cathode of the photodiode PDR, is higher than the reference voltage VREF, the comparison signal SCR is in a first state, here for example a low state.

When the voltage VK is lower than the reference voltage VREF, the comparison signal SCR is in a second state, here for example a high state.

The reference voltage VREF here functions as a discharge threshold that may be used to adjust the discharge time Tdi of the photodiode PDR. It should be noted that in order to detect a frequency of 2 kHz, the discharge time Tdi must not exceed 1/(2*2k) is, i.e. 250 µs.

The control stage 6 is intended to receive the comparison signal SCR and configured to deliver to the switch 5 a reset signal SRER depending on the comparison signal SCR so as to control the recharging of the photodiode PDR.

When the reset signal SRER is in the low state, the switch 5 is open, and therefore the cathode K of the photodiode PDR is not coupled to the positive supply terminal VDD.

As the photodiode PDR is sensitive to light, the voltage VK decreases at a rate that depends on the light intensity received by the photodiode PDR.

When the comparison signal SCR is in its high state, the control stage 6 is configured to deliver the reset signal SRER in its high state so as to switch the switch 5 to the closed state.

Thus, the cathode K of the photodiode PDR is once again connected to the positive supply terminal VDD. The voltage VK is substantially equal to the voltage on the supply terminal VDD which is higher than the reference voltage VREF. The comparison signal SCR is once again in the low state.

The control stage 6 here furthermore comprises an output OUT and is configured to deliver a value representative of a light level measured by the detector ALS. This representative value is here generated in the form of a DC signal SDC.

Details on the operation and structure of the control stage 6 may be found in French Patent Publication FR 2 997 496 filed on Oct. 25, 2012 (US counterpart U.S. Pat. No. 9,074,939B2 filed on Oct. 10, 2013), which are both incorporated herein by reference.

As will now be seen in more detail, the light level may thus be obtained via an AC signal. In this respect, the detector ALS furthermore comprises a selecting module 7 that is intended to receive all the comparison signals SCR, SCG and SCB of the photodiodes PDR, PDG and PDB and configured to selectively deliver one of the comparison signals SCR, SCG and SCB depending on a selection signal SS. The detector ALS furthermore comprises a second circuit 8 that is intended to receive the selected comparison signal SCi i=R, G, or B and configured to generate an AC signal SAC representative of the light level and of frequencies of the ambient luminous radiation illuminating the detector ALS.

By way of example, the selecting module 7 may comprise a conventional multiplexer known per se to those skilled in the art.

Figure 5:
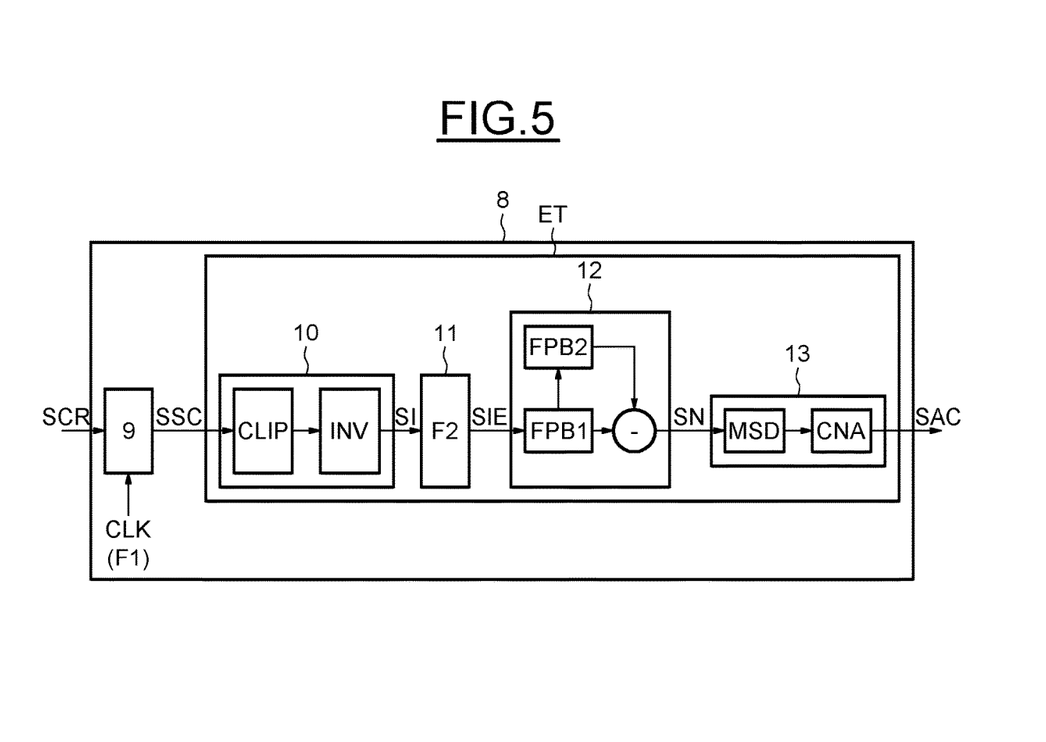

Reference is now made to FIG. 5 in order to illustrate an example embodiment of the second circuit 8.

The second circuit 8 includes a counter 9 that is intended to receive the comparison signal selected by the multiplexer, here for example the comparison signal SCR, and configured to be reset when the corresponding photodiode, here for example the photodiode PDR, reaches its discharge threshold.

Once reset and triggered, the counter 9 is then clocked by a clock signal CLK having a first frequency F1, here for example at 10 MHz.

The second circuit 8 also includes a processing stage ET including a converting module 13 that is configured to perform a digital-to-analog conversion of a digital signal SN obtained from the counter output signal SSC so as to generate an AC signal SAC representative of the level and of the one or more frequencies of the ambient luminous radiation.

Although not indispensable, it is preferable for the processing stage ET to include a processing module 10 that is configured to generate an intermediate signal SI by clipping CLIP and inverting INV the counter output signal SSC; a sampling module 11 that is configured to undersample the intermediate signal SI at a second frequency F2 lower than the first frequency F1; and a filtering module 12 that is configured to passband filter the sampled intermediate signal SIE.

It should be noted that in this case the digital signal SN to be converted to the analog domain is the filtered signal.

Moreover, sampling the intermediate signal SI at the known second frequency F2 advantageously allows subsequent digital filtering, here passband filtering, while removing the variability in the frequency of the triggering of the counter 9, which frequency varies depending on the ambient luminous radiation received by the photodiodes PDR, PDG, and PDB.

By way of indication, the second circuit 8 is completely implemented in digital technology in order to advantageously allow greater design flexibility and higher precision in the generation of the AC signal SAC.

Figure 6:
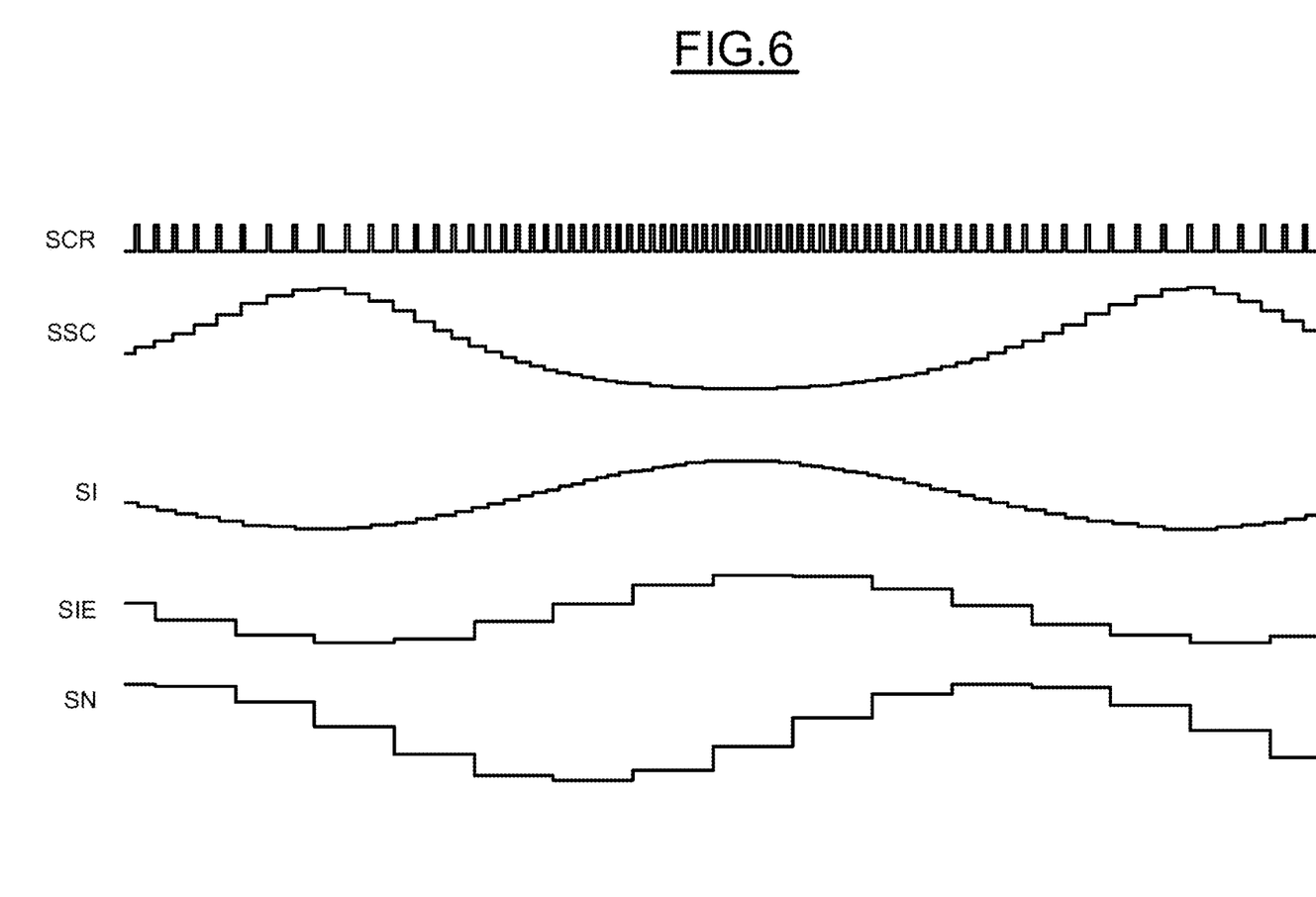

Reference is now made to FIG. 6 in order to present an example of a timing diagram illustrating the operation of the second circuit 8.

As described above, the comparison signal SCR is in the high state when the photodiode reaches its discharge threshold, or in other words when the voltage VK is lower than the reference voltage VREF.

Thus, the counter 9 is reset and triggered on the rising fronts of the selected comparison signal, here for example the signal SCR.

The counter 9 is clocked by the clock signal CLK at high frequency so as to clearly distinguish the discharge time Tdi varying as a function of the light intensity received by the photodiode PDR.

When the light intensity received is low, the discharge time Tdi becomes longer, thereby allowing a longer period between two resets of the counter 9.

Therefore, a low received light intensity leads to a longer discharge time and a higher value on the output of the counter 9.

After reset, the counter 9 is implemented on each rising front of the clock signal CLK. The longer the time between two resets, the higher the value of the counter before the following reset.

The output signal of the counter SSC is formed by the counter values obtained before each reset of the counter 9. The lower the light intensity received by the photodiode PDR, the higher the value of the counter output signal SSC.

In order to remove discharge times Tdi that are too long, the processing module 10 is configured to perform clipping CLIP, here for example at 216, on the counter output signal SSC.

In addition, the processing module 10 is configured to perform an inversion INV of the counter output signal SSC following the clipping so as to generate an intermediate signal SI the amplitude of which is proportional to the light intensity received by the photodiode PDR, as illustrated in FIG. 6.

In order to obtain a better balance between the performance and power consumption of the second circuit 8 while retaining design flexibility, the sampling module 11 is configured to generate the sampled intermediate signal SIE by undersampling the intermediate signal SI at a second frequency F2 that is less high than the first frequency F1.

By way of nonlimiting example, this second frequency F2 may be 16 kHz and obtained from the clock signal CLK.

As may be seen in FIG. 6, the amplitude of the sampled intermediate signal SIE is proportional to the light intensity received by the photodiode PDR just like the intermediate signal SI.

In practice, the flicker frequency of an artificial light source generally does not exceed 2 kHz. To further improve performance and decrease the power consumption of the detector, the filtering module 12 is configured to passband filter the sampled intermediate signal SIE.

By way of example, the passband filtering has a low cut-off frequency of about 66 Hz and a high cut-off frequency of about 2 kHz. The low cut-off frequency is set to 66 Hz because the conventional frequencies of 50 Hz/60 Hz are taken into account in the control stage 6 that generates the DC signal SDC.

As illustrated in FIG. 5, the filtering module may be produced using a first low-pass filter FPB1 having a cut-off frequency of 2 kHz coupled in series with a second low-pass filter FPB2 having a cut-off frequency of 66 Hz. The digital signal SN is obtained by subtracting the signal output from the first low-pass filter FPB1 and the signal output from the second low-pass filter FPB2.

The first and second low-pass filters FPB1 and FPB2 may for example be infinite impulse response (IIR) filters.

The digital signal SN therefore possesses a passband below 2 kHz. The dynamic range at 100 Hz is lower than 11 bits.

Thus, as illustrated in FIG. 5, the converting module 13 may for example comprise a sigma-delta modulator known per se to those skilled in the art and configured to perform a first-order sigma-delta modulation having a dynamic range of 12 bits at 10 MHz. The converting module 13 may further include a 1-bit digital-analog converter CNA that is known per se and configured to perform a 1-bit digital-to-analog conversion and to generate the AC signal SAC.

This signal SAC may then be filtered by an analog smoothing filter and delivered to a host processor of the detector ALS, for example a microcontroller, able to implement signal-processing operations such as a fast Fourier transform and a pulse width modulation (PWM) so as to extract information on the levels and the one or more flicker frequencies of the ambient luminous radiation from the AC signal SAC.

Thus, a detector of ambient light level capable of generating an AC signal representative of the ambient light levels and of frequencies of ambient luminous radiation in proximity to said detector is obtained.

Advantageously, the detector of ambient light level is also compatible with simultaneous generation of a DC signal.

What is claimed is:

1. An electronic circuit comprising:
   a photodiode;
   a counter that is configured to be clocked by a clock signal having a first frequency and configured to deliver a counter output signal;
   a control module that is configured to reset and trigger the counter when the photodiode illuminated by ambient luminous radiation reaches a discharge threshold, the control module configured to a generate a DC signal representative of a light level of the ambient luminous radiation; and
   a processing stage including a converting module configured to perform a digital-to-analog conversion of a digital signal obtained from the counter output signal so as to generate an AC signal representative of a frequency of the ambient luminous radiation, wherein the electronic circuit is configured to simultaneously output the DC signal and the AC signal.

2. The circuit according to claim 1, wherein the AC signal is representative of the level and of a frequency or frequencies of the ambient luminous radiation.

3. The circuit according to claim 1, wherein the first frequency is higher than the frequency of the reset of the counter.

4. The circuit according to claim 1, wherein the control module is furthermore configured to reset the photodiode when the latter reaches the discharge threshold.

5. The circuit according to claim 1, produced in digital technology.

6. The circuit according to claim 1, wherein the processing stage furthermore comprises a sampling module that is configured to undersample the counter output signal at a second frequency that is less high than the first frequency.

7. The circuit according to claim 6, wherein the processing stage furthermore comprises a filtering module configured to passband filter the undersampled counter output signal, the digital signal being the filtered signal.

8. The circuit according to claim 7, wherein the passband filtering possesses a low cut-off frequency of about 66 Hz and a high cut-off frequency of about 2 kHz.

9. An electronic circuit comprising:
   a photodiode;
   a counter that is configured to be clocked by a clock signal having a first frequency and configured to deliver a counter output signal;
   a control module that is configured to reset and trigger the counter when the photodiode illuminated by ambient luminous radiation reaches a discharge threshold; and
   a processing stage including a converting module configured to perform a digital-to-analog conversion of a digital signal obtained from the counter output signal so as to generate an AC signal representative of a level of the ambient luminous radiation, wherein the processing stage furthermore comprises a processing module configured to generate an intermediate signal by clipping and inverting the counter output signal, said digital signal being obtained from said intermediate signal.

10. The circuit according to claim 9, wherein the processing stage furthermore comprises a sampling module that is configured to undersample the intermediate signal at a second frequency that is less high than the first frequency.

11. The circuit according to claim 10, wherein the processing stage furthermore comprises a filtering module configured to passband filter the undersampled intermediate signal, the digital signal being the filtered signal.

12. The circuit according to claim 11, wherein the passband filtering possesses a low cut-off frequency of about 66 Hz and a high cut-off frequency of about 2 kHz.

13. A detector of ambient light level comprising:
an electronic circuit that comprises
a photodiode;
a counter that is configured to be clocked by a clock signal having a first frequency and configured to deliver a counter output signal;
a control module that is configured to reset and trigger the counter when the photodiode illuminated by ambient luminous radiation reaches a discharge threshold, the control module configured to a generate a DC signal representative of a light level of the ambient luminous radiation; and
a processing stage including a converting module configured to perform a digital-to-analog conversion of a digital signal obtained from the counter output signal so as to generate an AC signal representative of a frequency of the ambient luminous radiation.

14. An electronic device comprising a laptop, tablet, or cellular mobile telephone, the electronic device comprising the detector according to claim 13.

15. A motor vehicle comprising the detector according to claim 13.

16. A method of detecting ambient luminous radiation, the method comprising:
resetting and triggering a counter each time a photodiode illuminated by the ambient luminous radiation reaches a discharge threshold, the counter then being clocked by a clock signal having a first frequency and delivering a counter output signal; and
simultaneously output a DC signal and an AC signal by generating the DC signal representative of a light level of the ambient luminous radiation and generating the AC signal representative of a frequency of the ambient luminous radiation by converting, from digital to analog, a digital signal obtained from the counter output signal.

17. The method according to claim 16, wherein the AC signal is representative of the level and of one or more frequencies of the ambient luminous radiation.

18. The method according to claim 16, wherein the first frequency is higher than a reset frequency of the counter.

19. The method according to claim 16, wherein the photodiode is reset when it reaches said discharge threshold.

20. The method according to claim 16, wherein the discharge threshold of the photodiode is chosen so as to obtain a counter reset frequency of higher than 4 kHz.

21. The method according to claim 16, further comprising undersampling the counter output signal at a second frequency lower than the first frequency.

22. The method according to claim 21, further comprising passband filtering the undersampled counter output signal, the digital signal being the filtered signal.

23. The method according to claim 22, wherein the passband filtering comprising a low cut-off frequency of about 66 Hz and a high cut-off frequency of about 2 kHz.

24. A method of detecting ambient luminous radiation, the method comprising:
resetting and triggering a counter each time a photodiode illuminated by the ambient luminous radiation reaches a discharge threshold, the counter then being clocked by a clock signal having a first frequency and delivering a counter output signal;
generating an AC signal representative of a level of the ambient luminous radiation by converting, from digital to analog, a digital signal obtained from the counter output signal; and
generating an intermediate signal by clipping and inverting the counter output signal, and obtaining the digital signal from the intermediate signal.

25. The method according to claim 24, comprising undersampling the intermediate signal at a second frequency lower than the first frequency.

26. The method according to claim 25, further comprising passband filtering the undersampled intermediate signal, the digital signal being the filtered signal.

27. The method according to claim 26, wherein the passband filtering comprising a low cut-off frequency of about 66 Hz and a high cut-off frequency of about 2 kHz.

* * * * *